(12) United States Patent
Prioul et al.

(10) Patent No.: US 7,457,194 B2
(45) Date of Patent: Nov. 25, 2008

(54) DISCRIMINATING NATURAL FRACTURE- AND STRESS-INDUCED SONIC ANISOTROPY USING A COMBINATION OF IMAGE AND SONIC LOGS

(75) Inventors: Romain C. A. Prioul, Cambridge, MA (US); John Adam Donald, Highlands Ranch, CO (US); Randolph Koepsell, Highlands Ranch, CO (US); Tom R. Bratton, Littleton, CO (US); Peter Kaufman, Mt. Lebanon, PA (US); Claude Signer, Somerville, MA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 11/553,565

(22) Filed: Oct. 27, 2006

(65) Prior Publication Data

US 2008/0062814 A1    Mar. 13, 2008

Related U.S. Application Data

(60) Provisional application No. 60/825,298, filed on Sep. 12, 2006.

(51) Int. Cl.
*G01V 1/00* (2006.01)

(52) U.S. Cl. .............................. 367/25; 367/35; 181/105

(58) Field of Classification Search .................. 367/25, 367/35; 181/105
See application file for complete search history.

(56) References Cited

U.S. PATENT DOCUMENTS

| | | | |
|---|---|---|---|
| 4,831,600 A | | 5/1989 | Hornby et al. |
| 4,870,627 A | | 9/1989 | Hsu et al. |
| 5,060,204 A | * | 10/1991 | Winterstein .................. 367/75 |

(Continued)

OTHER PUBLICATIONS

Winkler, K. W., et al., Effects of borehole stress concentrations on dipole anisotropy measurements, Geophysics, 1998, pp. 11-17, vol. 63, No. 1.

(Continued)

*Primary Examiner*—Mark Hellner
(74) *Attorney, Agent, or Firm*—James McAleenan; Holmes Anderson; Jody Lynn DeStefanis

(57) ABSTRACT

Fracture- and stress-induced sonic anisotropy is distinguished using a combination of image and sonic logs. Borehole image and sonic logs are acquired via known techniques. Analysis of sonic data from monopole P- and S-waves, monopole Stoneley and cross-dipole shear sonic data in an anisotropic formation are used to estimate at least one compressional and two shear moduli, and the dipole fast shear direction. Fracture analysis of image logs enables determination of fracture types and geometrical properties. Geological and geomechanical analysis from image logs provide a priori discrimination of natural fractures and stress-induced fractures. A forward quantitative model of natural fracture- and stress-induced sonic anisotropy based on the knowledge of fracture properties interpreted from image logs allows the computation of the fast-shear azimuth and the difference in slowness between the fast- and slow-shear. The misfit between predicted and observed sonic measurements (i.e. fast-shear azimuth and slownesses) is then optimized in order to discriminate depth zones with an elastic medium as being influenced by the presence of open natural fractures, closed natural fractures and fractures induced by non-equal principal stress effects.

16 Claims, 2 Drawing Sheets

U.S. PATENT DOCUMENTS

| | | | |
|---|---|---|---|
| 5,214,613 A | 5/1993 | Esmersoy | |
| 5,243,521 A | 9/1993 | Luthi | |
| 5,398,215 A | 3/1995 | Sinha et al. | |
| 5,475,650 A | 12/1995 | Sinha et al. | |
| 5,808,963 A | 9/1998 | Esmersoy | |
| 5,960,371 A | 9/1999 | Saito et al. | |
| 5,999,486 A * | 12/1999 | DeVault | 367/36 |
| 6,125,330 A * | 9/2000 | Robertson et al. | 702/14 |
| 6,714,480 B2 | 3/2004 | Sinha et al. | |
| 6,714,873 B2 | 3/2004 | Bakulin et al. | |
| 6,718,266 B1 | 4/2004 | Sinha et al. | |
| 6,920,082 B2 * | 7/2005 | Tang | 367/31 |
| 6,925,031 B2 * | 8/2005 | Kriegshauser et al. | 367/25 |
| 6,944,094 B1 * | 9/2005 | Thomsen et al. | 367/57 |
| 7,035,165 B2 * | 4/2006 | Tang | 367/28 |
| 7,062,072 B2 * | 6/2006 | Anxionnaz et al. | 382/109 |
| 2003/0174581 A1 * | 9/2003 | Parra et al. | 367/56 |
| 2006/0235617 A1 * | 10/2006 | Sinha et al. | 702/6 |
| 2007/0183259 A1 * | 8/2007 | Yogeswaren et al. | 367/25 |
| 2007/0183260 A1 * | 8/2007 | Lee et al. | 367/25 |

OTHER PUBLICATIONS

Alford, R. M., Shear Data in the Presence of Azimuthal Anisotropy: Dilley, Texas, Society of Exploratory Geophysicists, 56th Annual International Meeting, 1986, pp. 476-479.

Bakulin, A., et al., Estimation of fracture parameters from reflection seismic data—Part 1: HTI model due to a single fracture set, Geophysics, 2000, pp. 1788-1802, vol. 65, No. 6.

Bakulin, A., Estimation of fracture parameters from reflection seismic data—Part 11: Fractured models with orthorhombic symmetry, Geophysics, 2000, pp. 1803-1817, vol. 65, No. 6.

Bakulin, A., et al., Estimation of fracture parameters from reflection seismic data—Part 111: Fractured models with monoclinic symmetry, Geophysics, 2000, pp. 1818-1830, vol. 65, No. 6.

Berard, T., et al., Evidence of thermally induced borehole elongation: a case study at Soultz, France, International Journal of Rock Mechanics and Mining Sciences, 2003, pp. 1121-1140, vol. 40.

Brudy, M., et al., Drilling-induced tensile wall-fractures: implications for determination of in-situ stress orientation and magnitude, International Journal of Rock Mechanics and Mining Sciences, 1999, pp. 191-215, vol. 36.

Desroches, J., et al., Combination of Microhydraulic Fracturing and Wellbore Images Provides Measurement of the Full Stress Tensor: A Case Study, SPWLA 46th Annual Logging Symposium, 2005, New Orleans, LA, pp. 1-14.

Donald, A., et al., Advancements in Acoustic Techniques for Evaluating Open Natural Fractures, SPWLA 47th Annual Logging Symposium, 2006, pp. 1-10.

Esmersoy, C., et al., Dipole shear anisotropy logging, 1994, Society of Exploratory Geophysicists, pp. 1139-1142.

Esmersoy, C., et al., Fracture and Stress Evaluation Using Dipole-Shear Anisotropy Logs, SPWLA 36th Annual Logging Symposium, 1995, pp. 1-12.

Etchecopar, A. et al., Shaping up to stress in the Apennines, Well Evaluation Conference, 2000, Italy, pp. 64-73.

Fuck, R. F., et al., Seismic signatures of two orthogonal sets of vertical microcorrugated fractures, Society of Exploratory Geophysicists Annual Meeting, 2005, Houston, pp. 146-150.

Grechka, V., et al., Effective elasticity of rocks with closely spaced and intersecting cracks, Geophysics, 2006, pp. D85-D91, vol. 71, No. 3.

Grechka, v., et al., Seismic characterization of multiple fracture sets: Does orthotropy suffice?, Geophysics, 2006, pp. D93-D105, vol. 71, No. 3.

Hornby, B. E., et al., Fracture evaluation using reflected Stoneley-wave arrivals, Geophysics, 1989, pp. 1274-1288, vol. 54, No. 10.

Hornby, B. E., et al., Comparison of Fracture Apertures Computed from Electrical Borehole Scans and Reflected Stoneley Waves: An Integrated Interpretation, The Log Analyst, 1992, pp. 50-66.

Hudson, J. A., Overall properties of a cracked solid, Mathematical Proceedings of the Cambridge Philosophical Society, 1980, pp. 371-384, vol. 88.

Kachanov, M., Effective elastic properties of cracked solids: critical review of some basic concepts, Applied Mechanics Review, ASME, 1992, pp. 304-335, vol. 45, No. 8.

Kachanov, M., Continuum Model of Medium with Cracks, Journal of the Engineering Mechanics Division, ASCE, 1980, pp. 1039-1051, vol. 106, No. EM5, Proc. Paper 15750.

Lubbe, R., A Field and Laboratory Investigation of the Compliance of Fractured Rock, Thesis submitted for the degree of Doctor of Philosophy to the University of Oxford, 2005, pp. 1-216.

Lubbe, R., et al., A field investigation of fracture compliance, Geophysical Prospecting, 2006, pp. 319-331, vol. 54.

Luthi, S. M., Geological Well Logs Their Use in Reservoir Modeling, 2000, pp. 74-146, Springer.

Luthi, S. M, et al., Fracture apertures from electrical borehole scans, Geophysics, 1990, pp. 821-833M, vol. 55, No. 7.

Mueller, M. C., et al., Case studies of the dipole shear anisotropy log, Society of Exploratory Geophysics, 1994, pp. 1143-1145.

Nelson, R. A., Geologic Analysis of Naturally Fractured Reservoirs, 2001, pp. 153-160, Gulf Professional Publishing.

Norris, A. N., et al., Weak elastic anisotropy and the tube wave, Geophysics, pp. 1091-1098, vol. 58, No. 8.

Pistre, V., et al., A Modular Wireline Sonic Tool for Measurements of 3D (Azimuthal, Radial, and Axial) Formation Acoustic Properties, SPWLA 46th Annual Logging Symposium, 2005, pp. 1-13.

Pistre, V., et al., A New Modular Sonic Tool Provides Complete Acoustic Formation Characterization, Society of Exploratory Geophysicists Annual Meeting, 2005, Houston, pp. 368-372.

Plona, T. J., et al., Using Acoustic Anisotropy, SPWLA 41st Annual Logging Symposium, 2000, pp. 1-12.

Prioul R., et al., Nonlinear rock physics model for estimation of 3D subsurface stress in anisotropic formations: Theory and laboratory verification, Geophysics, 2004, pp. 415-425, vol. 69, No. 2.

Prioul R., et al., Azimuthal anisotropy using shear dipole sonic: insights from the AIG 10 well, Corinth Rift Laboratory, C. R. Geoscience, 2004, pp. 477-485, vol. 336.

Pyrak-Nolte, L. J., The Seismic Response of Fractures and the Interrelations Among Fracture Properties, International Journal of Rock Mechanics and Mining Sciences & Geomechanics Abstracts, 1996, pp. 785-802, vol. 33, No. 8.

Pyrak-Nolte, L. J., et al., Transmission of Seismic Waves Across Single Natural Fractures, Journal of Geophysical Research, pp. 8617-8638, vol. 95, No. B6.

Sayers, C. M., Fluid-dependent shear-wave splitting in fractured media, Geophysical Prospecting, 2002, pp. 393-401, vol. 50.

Sayers, C. M., et al., Microcrack-induced elastic wave anisotropy of brittle rocks, Journal of Geophysical Research, 1995, pp. 4149-4156, vol. 100, No. B3.

Sayers, C. M., et al., A Simple Technique for Finding Effective Elastic Constants of Cracked Solids for Arbitrary Crack Orientation Statistics, International Journal of Solids and Structures, 1991, pp. 671-680, vol. 27, Issue 6.

Schoenberg, M., Elastic wave behavior across linear slip interfaces, Journal of the Acoustical Society of America, 1980, pp. 1516-1521, vol. 68.

Schoenberg, M., et al., Seismic anisotropy of fractured rock, Geophysics, 1995, pp. 204-211, vol. 60, No. 1.

Sinha, B. K., et al., Dispersion and radial depth of investigation of borehole modes, Geophysical Prospecting, 2004, pp. 271-286, vol. 52, Issue 4.

Sinha, B. K., et al., Radial profiling of three formation shear moduli, Society of Exploratory Geophysicists Annual Meeting, 2005, Houston, pp. 364-368.

Sinha, B. K., et al., Radial profiling of the three formation shear moduli and its application to well completions, Geophysics, 2006, pp. E65-E77, vol. 71, No. 6.

Sinha, B. K., et al., Dipole dispersion crossover and sonic logs in a limestone reservoir, Geophysics, 2000, pp. 390-407. vol. 65, No. 2.

Sinha, B. K., et al., Stress-induced azimuthal anisotropy in borehole flexural waves, Geophysics, 1996, pp. 1899-1907, vol. 61, No. 6.

Sinha, B. K., et al., Borehole flexural modes in anisotropic formations, Geophysics, 1994, pp. 1037-1052, vol. 59, No. 7.

Tang, X., et al., Simultaneous inversion of formation shear-wave anisotropy parameters from cross-dipole acoustic-array waveform data, Geophysics, 1999, pp. 1502-1511, vol. 64, No. 5.

Tezuka, K., et al., Modeling of low-frequency Stoneley-wave propagation in an irregular borehole, Geophysics, 1997, pp. 1047-1058, vol. 62, No. 4.

Thiercelin, M. J., et al., A New Wireline Tool for In-Situ Stress Measurements, Society of Petroleum Engineers Formation Evaluation, 1996, pp. 19-25, vol. 11, No. 1.

Vernik, L., et al., Estimation of Maximum Horizontal Principal Stress Magnitude From Stress-Induced Well Bore Breakouts in the Cajon Pass Scientific Research Borehole, Journal of Geophysical Research, 1992, pp. 5109-5119, vol. 97, No. B4.

Walsh, J., et al., Formation Anisotropy Parameters Using Borehole Sonic Data, SPWLA 47th Annual Logging Symposium, 2006, Veracruz, Mexico, pp. 1-7.

Wielemaker, E., Shear-Wave Anisotropy Evaluation in Mexico's Cuitlahuac Field Using a New Modular Sonic Tool, SPWLA 46th Annual Logging Symposium, 2005, New Orleans, LA, pp. 1-9.

Barton, Colleen A. "Discrimination of Natural Fractures from Drilling-Induced Wellbore Failures in Wellbore Image Data—Implicatiions for Reservoir Permeability"XP002464333, Database accession No. E2004098037912 Abstract and Proc SPE Int Pet Conf Exhib Mex; Proceedings of the SPE International Petroleum Conference and Exhibition of Mexico 2000, 2000, pp. 191-198, Database Compendex [Online], Engineering Information, Inc., New York, NY, US: Abstract.

Patent Cooperation Treaty, International Search Report and Written Opinion of the International Searching Authority for International Application No. PCT/US2007/078041, International Filing Date Sep. 10, 2007.

* cited by examiner

US 7,457,194 B2

DISCRIMINATING NATURAL FRACTURE- AND STRESS-INDUCED SONIC ANISOTROPY USING A COMBINATION OF IMAGE AND SONIC LOGS

CROSS-REFERENCE TO RELATED APPLICATIONS

A claim of priority is made to U.S. Provisional Patent Application Ser. No. 60/825,298, filed Sep. 12, 2006, entitled FORWARD MODELING OF FRACTURE-INDUCED ANISOTROPY IN BOREHOLE SONIC DATA, which is incorporated by reference.

FIELD OF THE INVENTION

The present invention is generally related to the fields of borehole geology and geophysics, and more particularly to the identification and evaluation of depth zones having an elastic medium modified by either natural fracture- or stressed-induced effects.

BACKGROUND OF THE INVENTION

Oil and natural gas are extracted from subterranean formations by drilling boreholes into hydrocarbon-bearing zones, building a well completion, and then recovering the product. Various sensors are utilized in order to enhance both the creation of the borehole and the productivity of the completed well. For example, wireline and logging-while-drilling sonic tools are utilized to measure the dynamic elastic properties of the formation around the borehole using compressional and shear velocity measurements. When the elastic properties of the formation are anisotropic, several velocities can be measured and used to partially or totally characterize the anisotropic elastic tensor, depending on the propagation and polarization direction. Various conditions can cause anisotropy, including but not limited to intrinsic rock properties, fractures, and non-equal principal stresses. The latter condition has some implications for wellbore stability, optimal hydraulic-fracturing, completion design, and other geophysical and petrophysical applications. Proper identification of the cause of the anisotropy is therefore important.

Certain techniques for identification of the cause of anisotropy are known. Monopole P- and S-waves, monopole Stoneley and cross-dipole shear sonic data in the anisotropic formation can be used to estimate one compressional and three shear moduli [Sinha, B., et al., *Radial profiling of three formation shear moduli*, 75th Ann. Internat. Mtg. Soc. of Expl. Geophys., 2005; U.S. Pat. No. 6,714,480, entitled "Determination of anisotropic moduli of earth formations", to Sinha, B., et al., issued Mar. 30, 2004, incorporated by reference herein in their entireties.] An orthorhombic formation with a vertical symmetry axis is characterized by three shear moduli: $c_{44}$, $c_{55}$ and $c_{66}$ In a vertical borehole, two vertical shear moduli ($c_{44}$ and $c_{55}$) can be directly estimated from azimuthal anisotropy analysis of cross-dipole waveforms. Fast-shear azimuth can be calculated using a method such as Alford rotation, and fast- and slow-shear slownesses can be estimated from the zero-frequency limits of cross-dipole dispersions [Alford, R. M., *Shear data in the presence of azimuthal anisotropy*, 56th Ann. Internat. Mtg., Soc. of Expl. Geophys. 1986; Esmersoy, C., et al., *Dipole shear anisotropy logging*, 64$^{th}$ Ann. Internat. Mtg, Soc. of Expl. Geophys., 1994; Sinha, B., et al., *Radial profiling of three formation shear moduli*, 75th Ann. Internat. Mtg. Soc. of Expl. Geophys., 2004; U.S. Pat. No. 5,214,613, entitled "Method and Apparatus for Determining Properties of Anisotropic Elastic Media" to Esmersoy, C., issued May 25, 1993; U.S. Pat. No. 5,808,963, entitled "Dipole Shear Anisotropy Logging", to Esmersoy, C., issued Sep. 15, 1998, or for an alternative method see U.S. Pat. No. 6,718,266, entitled "Determination of dipole shear anisotropy of earth formations" to Sinha, B., et al., issued Apr. 6, 2004; Tang, X., et al, *Simultaneous inversion of formation shear-wave anisotropy parameters from cross-dipole acoustic-array waveform data*, Geophysics, 1999, incorporated by reference herein in their entireties]. The third shear modulus, $c_{66}$, can be estimated from the Stoneley data, provided corrections are applied to remove any near-wellbore alteration and tool effects [Norris, A. N., et al., *Weak elastic anisotropy and the tube wave*, Geophysics, 1993, 58, 1091-1098; U.S. Pat. No. 6,714,480, entitled "Determination of anisotropic moduli of earth formations" to Sinha, B., et al., issued Mar. 30, 2004, incorporated by reference herein in their entireties]. Dipole dispersion curves are then used to identify the cause of the anisotropy of the elastic properties: (i) stress-induced effects (due to far field non equal principal stresses and near field stress concentration around the borehole) using the characteristic crossover of the dipole curves [Sinha, B. K., et al., *Stress-induced azimuthal anisotropy in borehole flexural waves*, Geophysics, 1996; Winkler, K. W., et al., *Effects of borehole stress concentrations on dipole anisotropy measurements*, Geophysics, 1998; Sinha, B. K., et al., *Dipole dispersion crossover and sonic logs in a limestone reservoir*, Geophysics, 2000; U.S. Pat. No. 5,398,215, entitled "Identification of Stress Induced Anisotropy in Formations" to Sinha, B., issued Mar. 14, 1995, incorporated by reference herein in their entireties], or (ii) intrinsic- or fracture-induced anisotropy using the characteristics of parallel dispersion curves [Sinha, B. K., et al., *Borehole flexural modes in anisotropic formations*, Geophysics, 1994; U.S. Pat. No. 5,398,215 entitled, "Identification of Stress Induced Anisotropy in Formations" to Sinha, B., issued Mar. 14, 1995, incorporated by reference herein in their entireties]. However when both fracture and stress effects are present, or when the analysis of dispersion curves is difficult to interpret due to attenuation of high frequencies [Donald, A. et al., *Advancements in acoustic techniques for evaluating natural fractures*, 47$^{th}$ Annu. Logging Symp., SPWLA, 2006, incorporated by reference herein in its entirety.], or when the symmetry axis of the anisotropic medium and the borehole axis are not aligned, the interpretation of the observed anisotropy becomes more challenging. Independent information has to be provided to confirm the observations and discriminate the relative importance of the different effects.

Discriminating the relative importance of the different effects is especially important when the principal stress directions and the normal to the natural fracture planes are not aligned. The analysis of the Stoneley mode reflections and attenuation allows the identification of open fractures in the borehole, and an estimation of their apertures [U.S. Pat. No. 4,870,627, entitled "Method and apparatus for detecting and evaluating borehole wall to Hsu, K., issued Sep. 26, 1989; Hornby, B. E., et al., *Fracture evaluation using reflected Stoneley-wave arrivals*, Geophysics; 1989; Tezuka, K., et al., *Modeling of low-frequency Stoneley-wave propagation in an irregular borehole*, Geophysics, 1997; U.S. Pat. No. 4,831, 600, entitled, "Borehole Logging Method for Fracture Detection and Evaluation" to Hornby, B., issued May 16, 1989, incorporated by reference herein in their entireties.] In addition, the interpretation of borehole images (electrical and ultrasonic) can be used to identify either open or closed fractures [Luthi, S. M., *Geological well logs: their use in reservoir modeling*, Springer, 2000; U.S. Pat. No. 5,243,521, entitled, "Width determination of fractures intersecting a borehole" to Luthi, S., issued Sep. 7, 1993, incorporated by reference herein in their entireties.] Fracture properties such as location and orientation can then be calculated. However, no practical technique exists for forward quantitative modeling of both natural fracture- and stress-induced sonic anisotropy in order to discriminate their relative effects.

SUMMARY OF THE INVENTION

In accordance with one embodiment of the invention, a method for distinguishing natural fracture- and stress-induced sonic anisotropy comprises the steps of: acquiring image data and sonic data associated with a borehole; employing the sonic data to estimate at least one compressional and two shear moduli, and the dipole fast shear direction; employing the image data to identify fracture type and orientation; computing fast-shear azimuth and difference in slowness between the fast- and slow-shear due to geological fractures; and identifying depth zones with an elastic medium as being influenced by at least one of the presence of open natural fractures, closed natural fractures and non-equal principal stress effects.

In accordance with another embodiment of the invention, apparatus for distinguishing fracture- and stress-induced sonic anisotropy comprises: a memory operable to store image data and sonic data associated with a borehole; circuitry operable to employ the sonic data to estimate at least one compressional and two shear moduli, and the dipole fast shear direction; circuitry operable to employ the image data to identify fracture type and orientation; circuitry operable to compute fast-shear azimuth and difference in slowness between the fast- and slow-shear due to geological fractures; and circuitry operable to identify depth zones with an elastic medium as being influenced by at least one of the presence of open natural fractures, closed natural fractures and non-equal principal stress effects.

DETAILED DESCRIPTION

Figure 1:
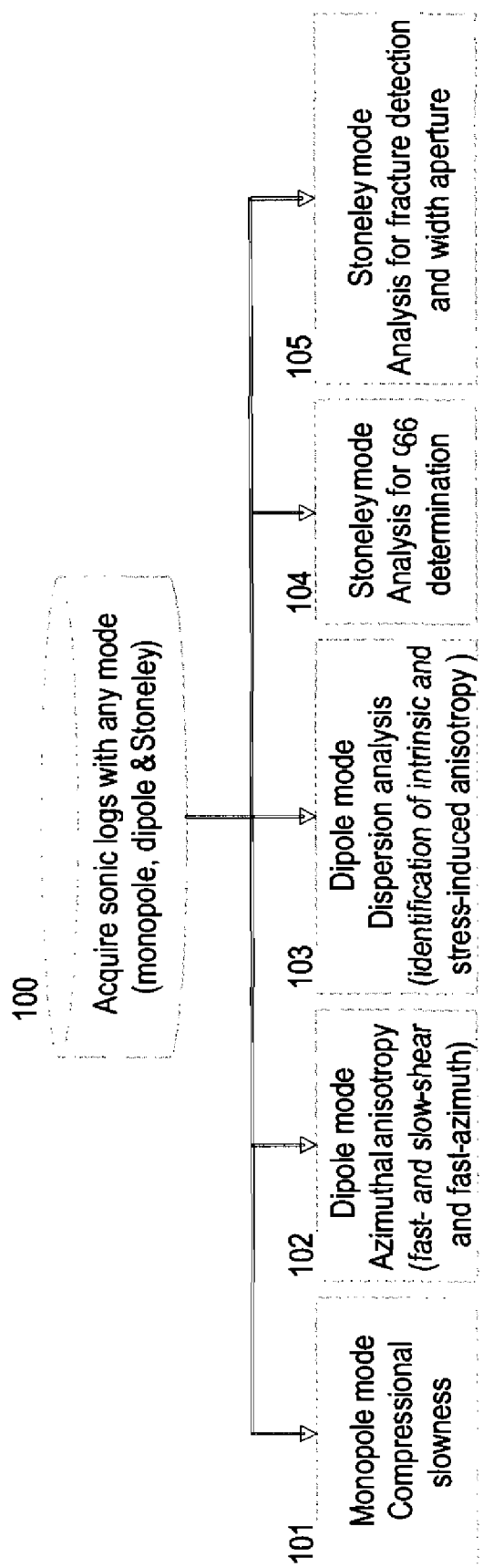
FIG. 1 illustrates a sonic processing in preparation for identification and evaluation of anisotropy.
Figure 2:
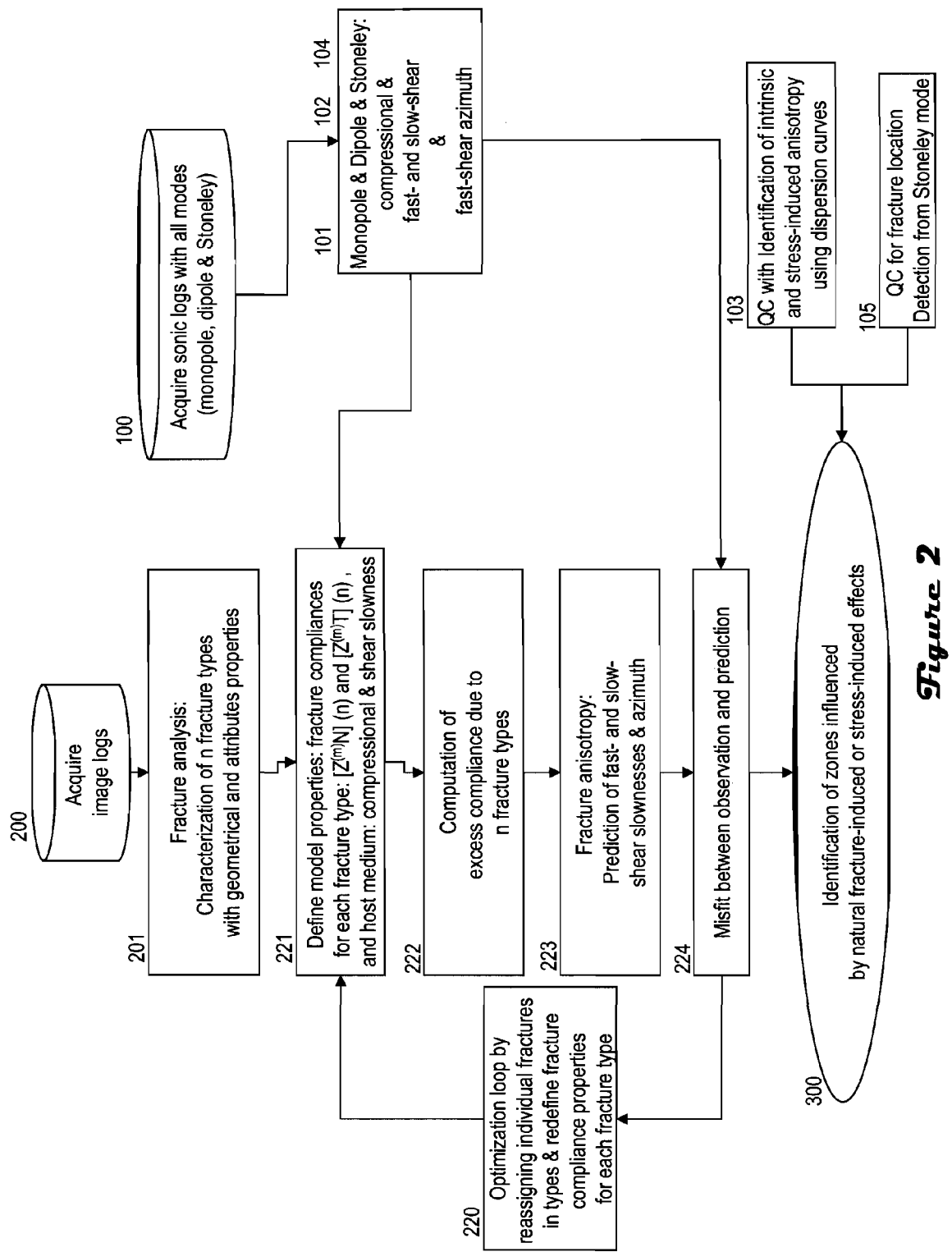
FIG. 2 illustrates identification and evaluation of depth zones having an elastic medium modified by the presence of natural fractures and non-equal principal stress effects, and any combination thereof.

Referring to FIGS. 1 and 2, in an initial step (100), sonic logs are acquired with any one or combination of available modes, including, but not limited to, monopole, dipole and Stoneley. Monopole P- and S-waves, monopole Stoneley and cross-dipole shear sonic data associated with an anisotropic formation are used to estimate one compressional and three shear moduli. An orthorhombic formation with a vertical symmetry axis is characterized by three shear moduli: $c_{44}$, $c_{55}$ and $c_{66}$.

The sonic logs acquired in step (100) are processed in preparation for identification and evaluation of sonic anisotropic slowness properties. As shown in step (101), monopole mode compressional slowness is identified. The compressional slowness from the monopole mode is used as an input in step (221). As shown in step (102), shear anisotropy is identified from the dipole mode data. In a vertical borehole, two vertical dipole shear moduli ($c_{44}$ and $c_{55}$) are directly estimated from azimuthal anisotropy analysis of cross-dipole waveforms. The fast shear direction (or azimuth) is also determined. Techniques for determining the fast-shear direction include, but are not limited to, Alford rotation and parametric inversion of the crossed-dipole waveforms. The highest of the shear moduli (either $c_{44}$ or $c_{55}$) is used as an input in step (221). The fast-shear azimuth and the fast- and slow-slowness are used as input data in step (224) for the computation of the misfit between predicted and observed sonic measurements. As shown in step (103), dipole dispersion curves can be used to identify the cause of the anisotropy: (i) stress-induced effects (due to far field non equal principal stresses and near field stress concentration around the borehole) using the characteristic crossover of the dipole curves, or (ii) intrinsic- or fracture-induced anisotropy using the characteristics of parallel dispersion curves. The dispersion curves are used as a quality control indicator in step (300). As shown in step (104), the third shear modulus, $c_{66}$, is estimated from the Stoneley data in a vertical borehole, provided corrections are applied to remove near-wellbore alteration and tool effects. The shear modulus from Stoneley is also used as an input in step (221) if it is the highest of the shear moduli when comparing $c_{44}$, $c_{55}$ and $c_{66}$. For non-vertical wells in an orthorhombic formation with a vertical or non vertical symmetry axis, steps (101, 102 and 104) are combined. Three elastic moduli are estimated using combined expressions for the speeds of the Sh- and Sv-waves along the borehole axis and a fourth combination of elastic moduli is estimated from the expression for the q-P wave speed. Then, the measured compressional slowness from the monopole ($DTco_{meas}$), and the lowest of the shear slownesses from the dipole ($DTs^{fast}_{meas}$) or from Stoneley ($DTs^{ST}$) are used as input in step (221). Fracture analysis from Stoneley mode is performed in step (105). The analysis of the Stoneley mode reflections allows the identification of open fractures in the borehole and an estimation of their apertures. The identification of fracture locations from Stoneley mode are used as a quality control indicator in step (300).

Referring now to FIG. 2, fracture analysis is performed in step (201) based on image logs acquired in step (200). Interpretation of borehole images generally includes bedding, structural, heterogeneity analysis as well as fracture analysis. The identification of fractures is based on the observation of a resistivity contrast with the host rock for electrical tools (either conductive or resistive fractures), and the combination of transit time and amplitude contrasts for ultrasonic tools. The interpretation of borehole images includes the discrimination of different fracture types (e.g. natural fractures and fractures induced by non-equal principal stresses and stress concentration around the borehole), and the determination of the geometrical properties of the fractures (i.e. location and orientation given as depth, dip angle and dip azimuth properties). The interpretation can also include the determination of fracture aperture [Luthi, S. M., et al., *Fracture apertures from electrical borehole scans*, Geophysics, 1990, incorporated herein in its entirety], fracture trace length connectivity, fracture porosity, reservoir fracture spacing and fracture intensity for fracture sets.

Geological and geomechanical analysis allow the discrimination of natural fractures and fractures induced by non-equal principal stresses and stress concentration around the borehole. Stress-induced fractures are tensile and shear drilling-induced fractures, breakouts and slips at pre-existing planes. Tensile drilling-induced fractures are easily detected on the borehole image because they are symmetrical relative to the borehole wall, traditionally near vertical and occur along planes perpendicular to the minimum principal stress. Shear drilling-induced fractures are detected in the orientation perpendicular to the minimum principle stress but develop asymmetrically on opposed sides of the borehole wall with a failure angle less than vertical and related to the mechanical strength of the lithologic unit. Breakouts are highlighted when one or preferably two undeformed arcs, i.e., whose radii are close to the radius of the bit, are separated by two damaged zones approximately 180° apart. A breakout appears where there is maximum tangential stress at the borehole wall. As a vertical well is often parallel to the vertical principal stress, breakouts simply indicate the azimuth of the minimum principal stress. A deviated well is oblique to the three main stresses which influence the maximum tangential stress. Slips planes in rocks can be reactivated during or after drilling. Such planes normally lie at an oblique angle to the current stress axes. In the illustrated technique, the number of fracture type (or sets) can be, but is not limited to, three when considering open natural fractures, closed natural fractures and stress-induced fractures. The fracture analysis of step (201) results in the determination of fracture types and geometrical properties (e.g. dip angle and dip azimuth) that will be used as inputs for computations in step (221).

When several planar fractures with various orientations are present and can be identified on image logs, the open fractures will generate an excess of compliance in the elastic medium, and consequently increase the sonic slownesses, i.e., decrease the velocity [see for example, Schoenberg, M., et al., *Seismic anisotropy of fractured rock, Geophysics*, 1995, incorporated by reference herein in its entirety]. However, healed fractures may reduce the overall compliance of the medium, e.g., quartz and calcite filled. Given the presence of one or several parallel fracture set(s), the long-wavelength effective medium can be seen as an anisotropic elastic rock with different possible symmetries, e.g., transversely isotropic, orthorhombic, monoclinic, or even triclinic. However, Grechka and Kachanov [Grechka, V., et al., *Seismic characterization of multiple fracture sets: does orthotropy suffice?, Geophysics*, 2006, incorporated by reference herein in its entirety.] showed that orthorhombic symmetry is generally sufficient for dry fractures regardless the number of fracture sets, their crack densities and orientations. Lower symmetries such as monoclinic and triclinic can be obtained if the fractures are filled with compressible fluids or if the roughness of the fracture surfaces is considered. Based on the interpretation of the fracture type, geometry and other fracture properties, the observed fractures that will have an impact on the elastic medium can be analyzed. Fracture openings observed from image logs and the Stoneley wave approach are typically on the order of 10 μm to 2 mm. Given a sonic frequency of 1-5 kHz and slownesses of 100-800 μs/ft, the typical sonic wavelengths are on the order of 0.25 ft to 10 ft (0.08 to 3.05 m). Thus, the low frequency sonic wavelength is always greater than the fracture opening. Another important parameter for a fracture set is the distance between adjacent fractures, described by the fracture intensity parameter (ratio of number of fractures over a given distance). Typical values of fracture intensity for very sparse sets are less than 0.75 (unit is 1/m), while for tight sets it may exceed 10 (1/m). The fracture spacing (inverse of fracture intensity) is always greater than the fracture opening, but the fracture spacing can be less than, equal to or greater than the sonic wavelength. When the fracture spacing is much smaller than the wavelength, effective-medium models can be applied, and the parameters of the model will depend only on the orientation and intensity of the fracture sets, the properties of the material filling the fractures, and the elastic coefficients of the host rocks [e.g. effective-medium theories for non-interacting cracks from [Kachanov, M. *Continuum model of medium with cracks, J. Eng. Mech. Div. Am. Soc. Civ. Eng.*, 1980; Schoe-nberg, M., *Elastic wave behavior across linear slip interfaces, Journal of the Acoustical Society of America*, 1980; Hudson, J. A, *Overall properties of a cracked solid, Mathematical Proceedings of the Cambridge Philosophical Society*, 1980, incorporated by reference herein in their entireties]. When the fracture spacing is close to or greater than the sonic wavelength, the effective-medium theories are not strictly valid to obtain a quantitative comparison of data and modeling. However, when first order scattering effects can be neglected, the modeling can still be used in a qualitative manner.

Sayers and Kachanov [Sayers, C. M., et al., *Microcrack-induced elastic wave anisotropy of brittle rocks, J. Geophys. Res.*, 1995, and Schoenberg and Sayers Schoenberg, M., et al., *Seismic anisotropy of fractured rock, Geophysics*, 1995, incorporated by reference herein in their entireties] describe a simple displacement discontinuity method for including the effects of geologically realistic cracks and fractures on seismic propagation through fractured rocks. They consider thin cracks of arbitrary shape and finite dimensions or sets of planar and parallel fractures for which the different cracks and fractures are non-interacting (each crack is assumed to be subjected to a uniform stress field that is not perturbed by the neighboring cracks). Numerical validations of the non-interaction approximation showed that crack or fracture interactions and intersections have little influence on the effective elasticity [Grechka, V. et al., *Effective elasticity of rocks with closely spaced and intersecting cracks, Geophysics*, 2006, incorporated by reference herein in its entirety]. With this hypothesis, the overall elastic compliance $s_{ijkl}$ can be decomposed through a linear addition of the crack or fracture set compliances $s^f_{ijkl}$ and the compliance of the host medium $s^h_{ijkl}$:

$$s_{ijkl} = s_{ijkl}^h + s_{ijkl}^f \quad \text{(eq. 1)}$$

When the cracks or fractures are rotationally invariant (e.g. flat), the excess compliances $s^f_{ijkl}$ to the host medium can be written as $$s^f_{ijkl} = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl} \quad \text{(eq. 2)}$$

where $\delta_{ij}$ is the Kronecker symbol, $\alpha_{ij}$ is a second-rank tensor, and $\beta_{ijkl}$ is a fourth-rank tensor. For individual cracks embedded in a representative volume V, Sayers and Kachanov (1995) defines $\alpha_{ij}$ and $\beta_{ijkl}$ as $$\alpha_{ij} = \frac{1}{V}\sum_r B_T^{(r)} n_i^{(r)} n_j^{(r)} A^{(r)} \quad \text{(eq. 3)}$$

$$\beta_{ijkl} = \frac{1}{V}\sum_r (B_N^{(r)} - B_T^{(r)}) n_i^{(r)} n_j^{(r)} n_k^{(r)} n_l^{(r)} A^{(r)} \quad \text{(eq. 4)}$$

where $B^{(r)}_N$ and $B^{(r)}_T$ are the normal and tangential compliance of the $r^{th}$ crack (units of length/stress), $n^{(r)}_i$ is the $i^{th}$ component of the normal to the crack, and $A^{(r)}$ is the area of the crack within V.

For sets of planar and parallel fractures, Schoenberg and Sayers (1995) defines $\alpha_{ij}$ and $\beta_{ijkl}$ as $$\alpha_{ij} = \frac{1}{V}\sum_m Z_T^{(m)} n_i^{(m)} n_j^{(m)} \quad \text{(eq. 5)}$$

$$\beta_{ijkl} = \frac{1}{V}\sum_m (Z_N^{(m)} - Z_T^{(m)}) n_i^{(m)} n_j^{(m)} n_k^{(m)} n_l^{(m)} \quad \text{(eq. 6)}$$

where $Z^{(m)}_N$ and $Z^{(m)}_T$ are the normal and tangential compliance of the $m^{th}$ fracture (units of 1/stress), $n^{(m)}_i$ is the $i^{th}$ component of the normal to the fracture. Relationships between the two formulations can be found for specific cases, for example, one set of N parallel thin cracks with regular spacing s=L/N and identical area A=L×L within a cube of V=L×L×L (cracks parallel to one face of the cube) gives $B_T N/1 = B_T/S = Z_T$ and $(B_N - B_T) N/1 = (B_N - B_T)/s = Z_N - Z_T$.

Based on fracture properties derived from the interpretation of borehole images, this model can be applied to the computation of fracture-induced sonic anisotropy if the long-wavelength effective-medium conditions are satisfied. The fracture compliances of the host rock $s^h_{ijkl}$ and the one of the fractures $Z^{(m)}_N$ and $Z^{(m)}_T$ have to be specified (221). The elastic medium probed between the sonic transmitter and receivers (given by the tool geometry) defines the volume over which the long-wavelength approximation is satisfied. The compliances of the host medium $s^h_{ijkl}$ are related to the elastic properties of the medium (i.e. sonic slownesses) without the fractures. They are unknown in the well since the medium with all combined effects is measured by: $s_{ijkl} = s^h_{ijkl} + s^f_{ijkl}$. However, a practical good starting point is to consider that the host medium as isotropic. Then, the two isotropic elastic constants are defined at discrete depths by the measured compressional slowness from the monopole (DTco$_{meas}$), the lowest of the shear slownesses from the dipole (DTs$^{fast}_{meas}$), and the density. In the case of a forward modeling problem, the normal $Z^{(m)}_N$ and tangential $Z^{(m)}_T$ compliances are unknowns and can be different for each fracture. In the present, each fracture (m) observed on the image log is assumed to be part of a fracture set (n) with a given type with compliances $[Z^{(m)}_N]^{(n)}$ and $[Z^{(m)}_T]^{(n)}$. At the beginning, each fracture will belong to a given set based on the geological interpretation. At a later stage of the workflow (220), each fracture may be reassigned to a different fracture set. For dry- or gas-filled fractures, $Z^{(m)}_N/Z^{(m)}_T \sim 1$ is a good approximation, but in general, for water- or oil-filled fractures, $Z^{(m)}_N/Z^{(m)}_T \ll 1$ (Sayers, 2002). When normal and tangential compliances are equal ($Z^{(m)}_N/Z^{(m)}_T = 1$), $\beta_{ijkl}$ vanishes and the lowest possible symmetry of the elastic tensor is orthorhombic. Estimates of fracture normal and shear compliances give values ranging from 0.01.1e-12 to 0.5.1e-12 m/Pa with laboratory measurements on rocks quartz monzonite and limestone; [Pyrak-Nolte, L. J., *The seismic response of fractures and the interrelationships among fracture properties: Int. J. Rock Mech. Min.*, 1995; Lubbe R., *A field and laboratory investigation of the compliance of fractured rocks, DPhil Thesis*, 2005, incorporated by reference herein in their entireties] and from 0.25.1e-12 to 3.5.1e-12 m/Pa with crosshole seismic experiments at dominant frequency of 2 kHz [Lubbe, R. et al., *A field investigation of fracture compliance, Geophys. Prosp.*, 2006, incorporated by reference herein in its entirety.] Normal and tangential compliances $Z^{(m)}_N$ and $Z^{(m)}_T$ relationships to physical properties of fractures are beyond the scope of this patent; see Pyrak-Nolte (1995) for more details. In the present method, we distinguish the different fracture type is distinguished by different fracture sets. For example, using borehole image interpretation, three sets of fracture can be defined as open natural fractures, closed natural fractures and stress-induced fractures. Since the fracture elastic compliance $s^f_{ijkl}$ (eq.5 and 6) is the result of a linear addition of the individual fracture contributions, the total fracture compliance can be decomposed into the linear addition of a given number of sets, for example, an open natural fracture component $s^{of}_{ijkl}$, a closed natural fracture component $s^{cf}_{ijkl}$, and a stress-induced component $s^{if}_{ijkl}$ in the form:

$$s^f_{ijkl} = s^{of}_{ijkl} + s^{cf}_{ijkl} + s^{if}_{ijkl} \quad \text{(eq. 7)}$$

The excess compliance tensors $s^{of}_{ijkl}$, $s^{cf}_{ijkl}$ and $s^{if}_{ijkl}$ are defined respectively as:

$$s^{of}_{ijkl} = \frac{1}{4}(\delta_{ik}\alpha^{of}_{jl} + \delta_{il}\alpha^{of}_{jk} + \delta_{jk}\alpha^{of}_{il} + \delta_{jl}\alpha^{of}_{ik}) + \beta^{of}_{ijkl} \quad \text{(eq. 8)}$$

$$s^{cf}_{ijkl} = \frac{1}{4}(\delta_{ik}\alpha^{cf}_{jl} + \delta_{il}\alpha^{cf}_{jk} + \delta_{jk}\alpha^{cf}_{il} + \delta_{jl}\alpha^{cf}_{ik}) + \beta^{cf}_{ijkl} \quad \text{(eq. 9)}$$

$$s^{if}_{ijkl} = \frac{1}{4}(\delta_{ik}\alpha^{if}_{jl} + \delta_{il}\alpha^{if}_{jk} + \delta_{jk}\alpha^{if}_{il} + \delta_{jl}\alpha^{if}_{ik}) + \beta^{if}_{ijkl} \quad \text{(eq. 10)}$$

with second-ranks, $\alpha^{of}_{ij}$, $\alpha^{cf}_{ij}$ and $\alpha^{if}_{ij}$, and fourth-rank tensors, $\beta^{of}_{ij}$, $\beta^{cf}_{ij}$ and $\beta^{if}_{ij}$ defined using equations (eq.5) and (eq.6) with the respective normal and tangential components $[Z^{(m)}_N]^{(of)}$, $[Z^{(m)}_T]^{(of)}$, $[Z^{(m)}_N]^{(cf)}$, $[Z^{(m)}_T]^{(cf)}$, $[Z^{(m)}_N]^{(if)}$, and $[Z^{(m)}_T]^{(if)}$. In Step 221, depending on the number of sets defined, normal and tangential compliances are assigned to each set (n) as $[Z^{(m)}_N]^{(n)}$ and $[Z^{(m)}_T]^{(n)}$.

Excess compliance due to all fracture sets is calculated using (eq.7) in step (222).

Prediction of fast and slow shear slowness and azimuth is performed in step (223). Once the above-described parameters have been defined, computations can be performed at discrete depth points. At discrete selected depth, fractures present within a depth window below and above the chosen depth are included in the computation, and the knowledge of the fracture depths, dip angles and dip azimuths permits determination of $n^{(r)}_i$ for each fracture, and the computation of the overall elastic compliance tensor. The compliance tensor can be inverted to find the stiffness tensor. Note that in this approach there is no assumption made of any particular symmetry of the elastic medium. The stiffness tensor is then used to solve for motion via the Christoffel equation for arbitrary anisotropy. Given a direction of propagation along the borehole axis, we solve for the polarization vectors of the three modes of elastic wave propagation, one compressional qP-wave, and two shear qS1- and qS2-waves. Analysis of the azimuthal variation of shear-wave velocities in the plane orthogonal to the borehole provides the two properties commonly observed in sonic anisotropy: the fast shear azimuth, and the two, fast- and slow-shear slownesses.

The output of step (223), i.e., predicted fast-shear azimuth and fast- and shear-slownesses, is utilized in step (224).

In step (224) the misfit between observation and prediction are utilized to discriminate between zones influenced by open natural fractures, closed natural fractures and stress-induced fractures. At depth z the prediction error or misfit between observed and predicted fast-shear azimuth and slowness difference can be expressed as:

$$e_i^{100}(x) = \phi_i^{obs} - \phi_i^{pre}(x) \quad \text{(eq.11)}$$

$$e_i^{DTs}(x) = (DTs^{slow} - DTs^{fast})_i^{obs} - (DTs^{slow}(x) - DTs^{fast}(x))_i^{pre} \quad \text{(eq.12)}$$

Then, the following norms $L_n$ of the misfit vector are defined:

$$\|e\|_n = \left[\sum_i |e_i|^n\right]^{1/n} \quad \text{(eq. 13)}$$

or $$\|e'\|_n = \left[\sum_i \left|\frac{e_i}{\sigma_i}\right|^n\right]^{1/n} \quad \text{(eq. 14)}$$

where $\sigma_i$ are the standard deviations on the observations used in equations (e.q. 11) and (e.q. 12).

Using equations (e.q. 11) and (e.q. 12), the following norm is defined:

$$\|e^\varphi\|_n = \left[\sum_i |e_i^\varphi|^n\right]^{1/n} \quad \text{(eq. 15)}$$

$$\|e^\varphi\|_n = \left[\sum_i \left|\frac{e_i^\varphi}{\sigma_i^\varphi}\right|^n\right]^{1/n} \quad \text{(eq. 16)}$$

$$\|e^{DTs}\|_n = \left[\sum_i |e_i^{DTs}|^n\right]^{1/n} \quad \text{(eq. 17)}$$

$$\|e^{DTs'}\|_n = \left[\sum_i \left|\frac{e_i^{DTs}}{\sigma_i^{DTs}}\right|^n\right]^{1/n} \quad \text{(eq. 18)}$$

$$\|e^{tot}\|_n = \|e^{\varphi'}\|_n + \|e^{DTs'}\|_n \quad \text{(eq. 19)}$$

Then, by reassigning individual fracture in different types and redefining fracture compliance properties for each fracture type, an optimization loop (step 220) is performed in repeating computation steps 221, 222, 223, 224. The above equations (eq. 15, eq. 16, eq. 17, eq. 18, independently, or eq. 19 for a joint inversion) can be minimized as an inverse problem in order to find the optimum type and compliances parameters $[Z^{(m)}{}_N]^{(of)}$, $[Z^{(m)}{}_T]^{(of)}$, $[Z^{(m)}{}_N]^{(cf)}$, $[Z^{(m)}{}_T]^{(m)}$, $[Z^{(m)}{}_N]^{(if)}$, and $[Z^{(m)}{}_T]^{(if)}$ for each fracture for the given depth interval. Any inversion scheme (least-squares or not, i.e., n=2 or n≠2) that minimize equations 15, 16, 17, 18, and 19 can also be defined. The optimization loop stops when quantities in equations 15, 16, 17, 18, and 19 are below defined criteria. The output of 224 is a collection of fractures that have been reassigned to one of the three fracture type:

open natural fractures, closed natural fractures and stress-induced fractures, and for which the compliance parameters $[Z^{(m)}{}_N]^{(of)}$, $[Z^{(m)}{}_T]^{(of)}$, $[Z^{(m)}{}_N]^{(cf)}$, $[Z^{(m)}{}_T]^{(cf)}$, $[Z^{(m)}{}_N]^{(if)}$, and $[Z^{(m)}{}_T]^{(if)}$ are now known.

In step 300, at discrete depths within a depth window, the proportion of fractures for each of the three types is computed and displayed as curve color coded/shaded, indicating zones influenced by open natural fractures, closed natural fractures and stress-induced fractures.

Results can be compared with zones of intrinsic and stress-induced anisotropy identified using dipole dispersion curves (Step 104) and the zones where fracture have been identified using Stoneley mode (Step 105).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for distinguishing natural fracture induced and stress induced sonic anisotropy comprising the steps of:
   acquiring image data and sonic data associated with a borehole;
   employing the sonic data to estimate at least one compressional and at least two shear moduli, and a fast shear direction so as to extract observed data;
   employing the image data to identify fracture type and orientation;
   computing the fast shear direction and difference in slowness between the fast shear and the slow shear due to geological fractures so as to compute predicted data;
   computing misfit from the difference between the observed data and the predicted data so as to optimize evaluation of one or more depth zone; and
   identifying the one or more depth zone as being influenced by at least one of open natural fractures, closed natural fractures or stress-induced effects.

2. The method of claim 1 including the further step of computing fast shear direction and the difference in slowness between the fast shear and the slow shear due to geological fractures with a forward quantitative model of natural fracture induced and the stress induced sonic anisotropy based on knowledge of fracture properties interpreted from the image data.

3. The method of claim 2 wherein the forward quantitative model is based on a mechanical model.

4. The method of claim 1 including the further step of employing monopole P- waves to estimate compressional slowness and associated elastic moduli.

5. The method of claim 4 including the further step of employing monopole S-waves to estimate the shear slowness and associated elastic moduli.

6. The method of claim 5 including the further step of employing cross-dipole shear sonic data to estimate two shear slownesses and associated elastic moduli and fast shear direction.

7. The method of claim 6 including the further step of employing Monopole Stoneley to estimate the shear slowness and associated moduli.

8. The method of claim 1 including the further step of employing image data to identify fracture properties by geological and geomechanical analysis leading to a priori discrimination between one of open natural fractures, closed natural fractures or stress induced effects.

9. Apparatus for distinguishing fracture induced and stress induced sonic anisotropy comprising:
   a memory operable to store image data and a sonic data associated with a borehole;
   circuitry operable to employ the sonic data to estimate at least one compressional and at least two shear moduli, and a fast shear direction so as to extract observed data;
   circuitry operable to employ the image data to identify fracture type and orientation;
   circuitry operable to compute fast shear direction and the difference in slowness between the fast shear and the slow shear due to geological fractures so as to compute predicted data;

computing misfit from the difference between the observed data and the predicted data so as to optimize evaluation of one or more depth zone; and circuitry operable to identify one or more depth zone as being influenced by at least one of open natural fractures, closed natural fractures or stress-induced effects.

10. The apparatus of claim 9 further including circuitry operable to compute fast shear direction and the difference in slowness between the fast shear and the slow shear due to geological fractures with a forward quantitative model of natural fracture induced and stress induced sonic anisotropy based on knowledge of fracture properties interpreted from the image data.

11. The apparatus of claim 10 wherein the forward quantitative model is based on a mechanical model.

12. The apparatus of claim 9 further including circuitry operable to employ monopole P- waves to estimate compressional slowness and associated elastic moduli.

13. The apparatus of claim 12 further including circuitry operable to employ monopole S-waves to estimate the shear slowness and associated elastic moduli.

14. The apparatus of claim 13 further including circuitry operable to employ cross-dipole shear sonic data to estimate two shear slownesses and associated elastic moduli and fast shear direction.

15. The apparatus of claim 14 further including circuitry operable to employ Monopole Stoneley to estimate the shear slowness and associated moduli.

16. The apparatus of claim 9 further including circuitry operable to employ image data to identify fracture properties by geological and geomechanical analysis leading to a priori discrimination between one of open natural fractures, closed natural fractures or stress induced effects.

* * * * *